(12) United States Patent
Lee (10) Patent No.: US 11,119,588 B2
(45) Date of Patent: Sep. 14, 2021

(54) WIRELESS MOUSE AND SWITCH MODULE APPLIED THEREIN

(71) Applicant: Cheng Uei Precision Industry Co., Ltd., New Taipei (TW)

(72) Inventor: Tsung Shih Lee, New Taipei (TW)

(73) Assignee: Cheng Uei Precision Industry Co., Ltd., New Taipei (TW)

(*) Notice: Subject to any disclaimer, the term of this patent is extended or adjusted under 35 U.S.C. 154(b) by 0 days.

(21) Appl. No.: 16/927,966

(22) Filed: Jul. 13, 2020

(65) Prior Publication Data
US 2021/0096665 A1 Apr. 1, 2021

(30) Foreign Application Priority Data

Sep. 27, 2019 (CN) .......................... 201921625658.6

(51) Int. Cl.
| | |
|---|---|
| *G06F 3/033* | (2013.01) |
| *G06F 3/0354* | (2013.01) |
| *G06F 3/02* | (2006.01) |
| *H01H 13/52* | (2006.01) |

(52) U.S. Cl.
CPC ............ *G06F 3/03543* (2013.01); *G06F 3/02* (2013.01); *H01H 13/52* (2013.01)

(58) Field of Classification Search
USPC .......................... 345/156, 160, 163; 200/530
See application file for complete search history.

(56) References Cited

U.S. PATENT DOCUMENTS

| 7,312,789 B2* | 12/2007 | Koike | G06F 3/0312 |
| | | | 345/156 |
| 10,509,415 B2* | 12/2019 | Bosworth | G01C 21/00 |
| 2003/0103040 A1* | 6/2003 | Koike | G06F 3/0312 |
| | | | 345/163 |
| 2006/0139329 A1* | 6/2006 | Lin | G06F 3/03543 |
| | | | 345/163 |
| 2010/0066678 A1* | 3/2010 | Lin | G06F 3/03543 |
| | | | 345/163 |
| 2015/0136577 A1* | 5/2015 | Chu | H01H 13/14 |
| | | | 200/530 |
| 2015/0205383 A1* | 7/2015 | Chang | G06F 3/0383 |
| | | | 345/179 |
| 2015/0277589 A1* | 10/2015 | Gunnar | H01H 25/008 |
| | | | 345/163 |

(Continued)

*Primary Examiner* — Thuy N Pardo
(74) *Attorney, Agent, or Firm* — Lin & Associates IP, Inc.

(57) ABSTRACT

A switch module includes a pressing button, a supporting block and a circuit board. The pressing button has a first surface and a second surface. The second surface of the pressing button has an operation portion. The operation portion is equipped with an extending arm. At least one portion of one side of the first surface of the pressing button protrudes upward to form at least one extending foot. The supporting block supports the pressing button. The supporting block has a third surface and a fourth surface. The circuit board faces to the third surface of the supporting block. The circuit board has a fifth surface and a sixth surface. The circuit board is equipped with a first switch. The sixth surface of the circuit board is equipped with a second switch. The first switch is disposed corresponding to the at least one extending foot.

19 Claims, 9 Drawing Sheets

(56) References Cited

U.S. PATENT DOCUMENTS

| | | | |
|---|---|---|---|
| 2015/0286296 A1* | 10/2015 | Wang | G06F 3/0317 |
| | | | 345/163 |
| 2020/0117298 A1* | 4/2020 | Hsu | G06F 3/046 |
| 2020/0201451 A1* | 6/2020 | Lee | G06F 3/0362 |
| 2021/0082247 A1* | 3/2021 | Halvorson | G07F 17/3244 |

* cited by examiner

WIRELESS MOUSE AND SWITCH MODULE APPLIED THEREIN

CROSS-REFERENCE TO RELATED APPLICATION

The present application is based on, and claims priority from, China Patent Application No. 201921625658.6, filed Sep. 27, 2019, the disclosure of which is hereby incorporated by reference herein in its entirety.

BACKGROUND OF THE INVENTION

1. Field of the Invention

The present invention generally relates to a switch and a mouse, and more particularly to a wireless mouse, and a switch module applied in the wireless mouse which has a lower cost and saves an occupying space.

2. The Related Art

As is known to all, a wireless mouse has a wireless transmission capacity and is capable of being paired with a computer host to be used by a wireless technology. When a user operates the wireless mouse, the wireless mouse is used without a limitation of a cable, so the wireless mouse is used quite conveniently.

Generally, when a conventional wireless mouse is paired with the computer host, a USB (Universal Serial Bus) adaptor need be inserted into an insertion hole of the computer host. Operation orders of the conventional wireless mouse are capable of being transmitted to the computer host. However, the conventional wireless mouse need provide the USB adaptor to the user, and the conventional wireless mouse is rather smaller in size, so when the conventional wireless mouse is used, the conventional wireless mouse will have a loss problem.

Another conventional wireless mouse is a bluetooth mouse, the bluetooth mouse is capable of being paired with the computer host to be used through a bluetooth technology, and the USB adaptor is needless of being provided in addition. However, the bluetooth mouse need provide a pairing key additionally, when the user uses the bluetooth mouse, a power switch of the bluetooth mouse must be turned on, and then the pairing key is pressed to proceed with a bluetooth pairing.

Furthermore, the bluetooth mouses on the market, the power switch and a bluetooth pairing key of the bluetooth mouse are mostly two independent and separated structures, so the bluetooth mouse has a higher manufacturing cost and a larger space is considered to mount the power switch and the bluetooth paring key in the bluetooth mouse. As a result, the bluetooth mouse needs a larger occupying space.

In view of the above-mentioned problems, it is essential to provide an innovative wireless mouse, and an innovative switch module applied in the innovative wireless mouse which has a lower cost and saves an occupying space.

SUMMARY OF THE INVENTION

An object of the present invention is to provide a switch module applied in a wireless mouse. The switch module includes a pressing button, a supporting block and a circuit board. The pressing button has a first surface, and a second surface opposite to the first surface. The second surface of the pressing button has an operation portion protruded outward. The operation portion moves from a first position to a second position. One end of the operation portion is equipped with an extending arm. At least one portion of one side of the first surface of the pressing button protrudes upward to form at least one extending foot. At least one portion of the other side of the first surface of the pressing button protrudes upward to form at least one limiting block. The supporting block supports the pressing button. The supporting block has a third surface, and a fourth surface opposite to the third surface. The fourth surface faces to the first surface. The fourth surface of the supporting block defines at least one sliding rail recessed inward. The pressing button is located to the supporting block. The at least one limiting block is disposed in the at least one sliding rail. The circuit board faces to the third surface of the supporting block. The circuit board has a fifth surface, and a sixth surface opposite to the fifth surface. The fifth surface of the circuit board is equipped with a first switch. The sixth surface of the circuit board is equipped with a second switch. The first switch is disposed corresponding to the at least one extending foot, when the operation portion is located at the first position, the at least one extending foot is without driving the first switch, and the first switch is located at an initial position, when the operation portion is located at the second position, the at least one extending foot drives the first switch, and the extending arm is corresponding to the second switch.

Another object of the present invention is to provide a switch module applied in a wireless mouse. The switch module includes a pressing button, a supporting block and a circuit board. The pressing button has a first surface, and a second surface opposite to the first surface. The second surface of the pressing button has an operation portion. The cantilever arm is connected with an extending arm disposed to one end of the operation portion. The operation portion moves from a first position to a second position. At least one portion of one side of the first surface of the pressing button protrudes upward to form at least one extending foot. The supporting block has a third surface, and a fourth surface opposite to the third surface. The fourth surface faces to the first surface. A sliding assembly is slidably disposed between the first surface of the pressing button and the fourth surface of the supporting block. The circuit board faces to the third surface of the supporting block. The circuit board is equipped with a first switch and a second switch. When the operation portion is located at the first position, the at least one extending foot is disposed to one side of the first switch, when the pressing button slides by the sliding assembly to make the operation portion move to the second position, the at least one extending foot pushes against the first switch. The second switch is disposed between the circuit board and the extending arm of the pressing button.

Another object of the present invention is to provide a wireless mouse. The wireless mouse includes a lower shell, an upper shell and a switch module. The upper shell is covered to the lower shell to form an accommodating space between the upper shell and the lower shell. The switch module accommodated in the accommodating space, includes a pressing button, a supporting block and a circuit board. The pressing button has a first surface, and a second surface opposite to the first surface. The second surface of the pressing button has an operation portion protruded outward. The operation portion moves from a first position to a second position. One end of the operation portion is equipped with an extending arm. At least one portion of one side of the first surface of the pressing button protrudes upward to form at least one extending foot. At least one portion of the other side of the first surface of the pressing button protrudes upward to form at least one limiting block. The supporting block supports the pressing button. The supporting block has a third surface, and a fourth surface opposite to the third surface. The fourth surface faces to the first surface. The fourth surface of the supporting block defines at least one sliding rail recessed inward. The pressing button is located to the supporting block. The at least one limiting block is disposed in the at least one sliding rail. The circuit board faces to the third surface of the supporting block. The circuit board has a fifth surface, and a sixth surface opposite to the fifth surface. The fifth surface of the circuit board is equipped with a first switch. The sixth surface of the circuit board is equipped with a second switch. The first switch is disposed corresponding to the at least one extending foot, when the operation portion is located at the first position, the at least one extending foot is without driving the first switch, and the first switch is located at an initial position, when the operation portion is located at the second position, the at least one extending foot drives the first switch, and the extending arm is corresponding to the second switch.

As described above, when the operation portion of the pressing button is pushed frontward and rearward, the at least one extending foot drives the first switch of the circuit board to realize a power function, when the operation portion of the pressing button is located at the first position, the at least one extending foot is without driving the first switch, at the moment, the power function is turned off, when the operation portion of the pressing button is located at the second position, the at least one extending foot drives the first switch, at the moment, the power function is turned on, the operation portion is capable of being pressed towards the circuit board to make the extending arm press the second switch of the second the circuit board to execute a bluetooth pairing function. As a result, the switch module is capable of reducing a manufacturing cost to have a lower cost and reducing an assembling space of the switch module to save an occupying space.

BRIEF DESCRIPTION OF THE DRAWINGS

The present invention will be apparent to those skilled in the art by reading the following description, with reference to the attached drawings, in which:

FIG. 8 is a schematic diagram showing that a power function of the wireless mouse in accordance with the present invention is turned on; and FIG. 9 is a schematic diagram showing that the power function of the switch module in accordance with the present invention is turned on.

DETAILED DESCRIPTION OF THE PREFERRED EMBODIMENT

Figure 1:
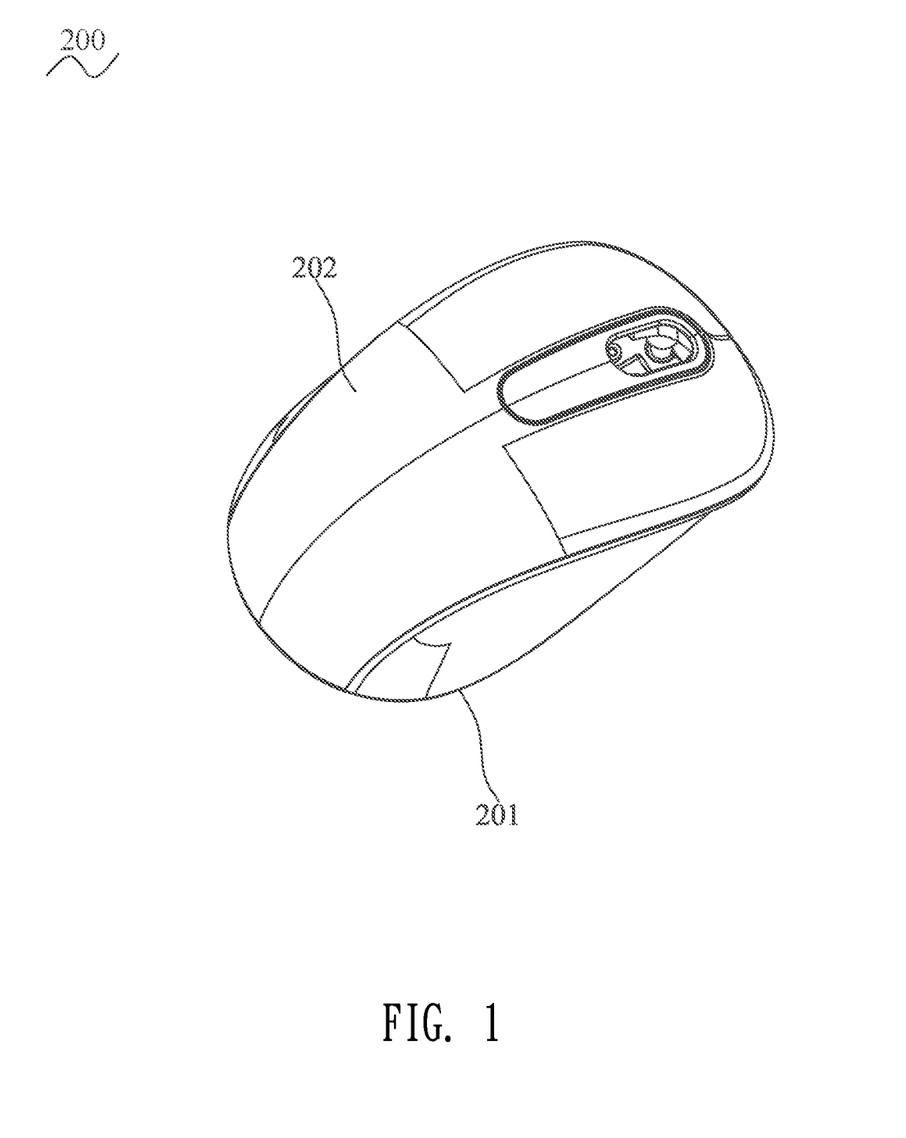
FIG. 1 is a perspective view of a wireless mouse in accordance with a preferred embodiment of the present invention.
Figure 2:
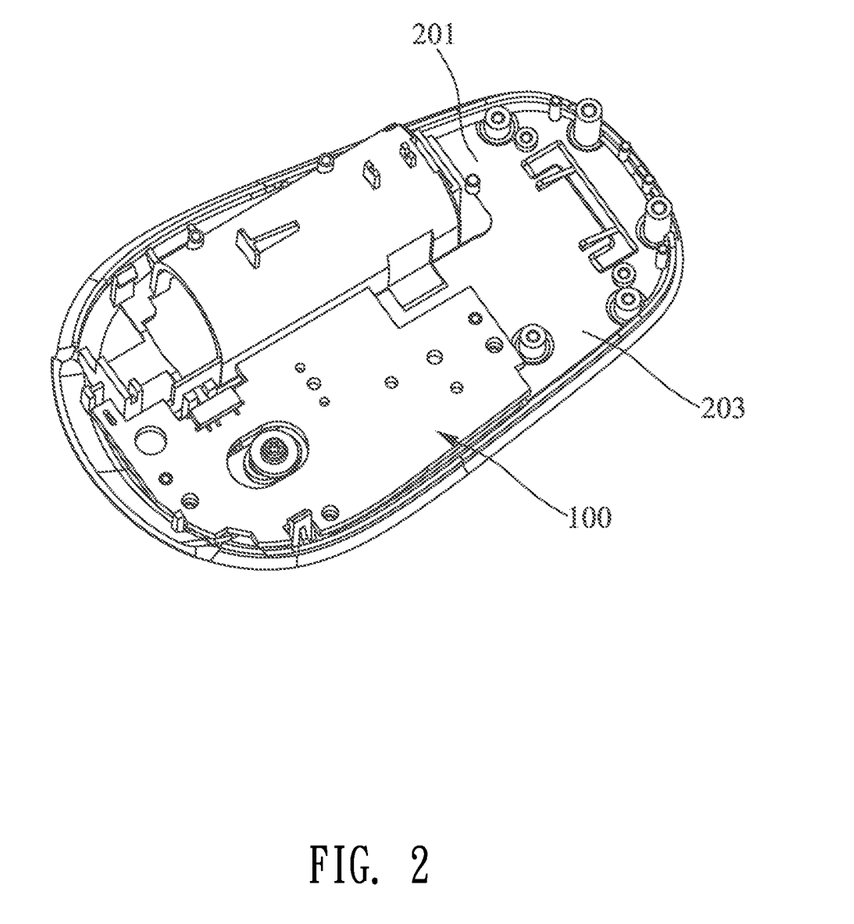
FIG. 2 is a location diagram of a switch module applied in the wireless mouse of FIG. 1.
Figure 3:
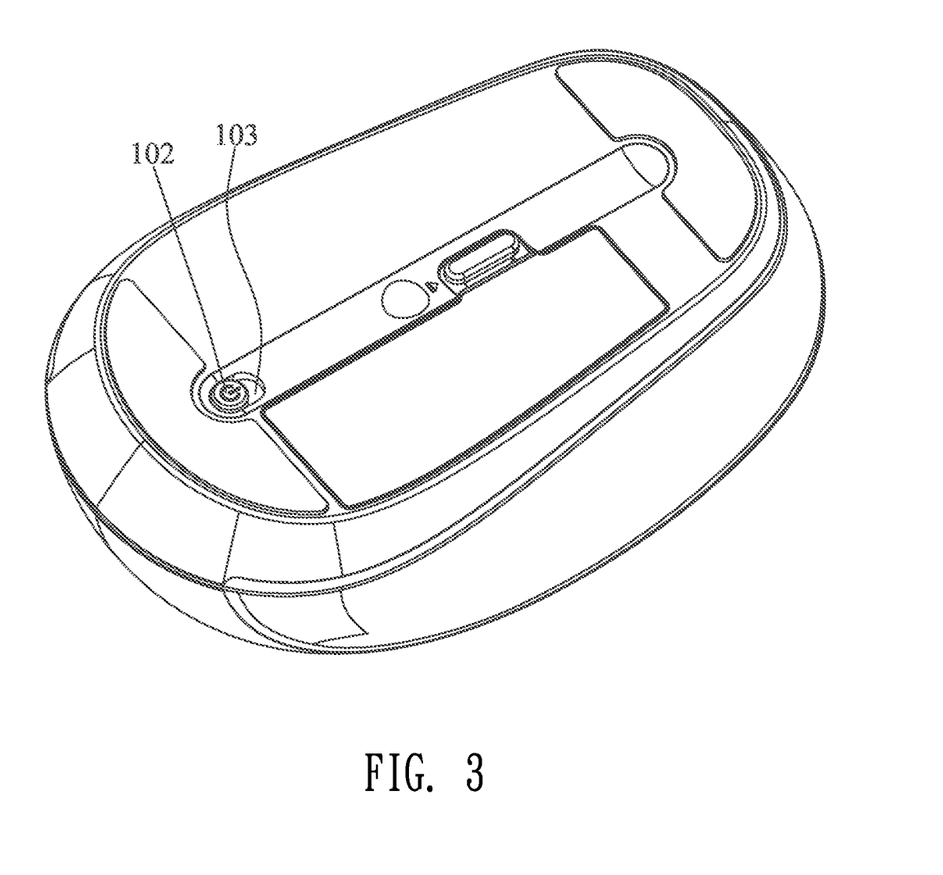
FIG. 3 is another perspective view of the wireless mouse of FIG. 1.
Figure 4:
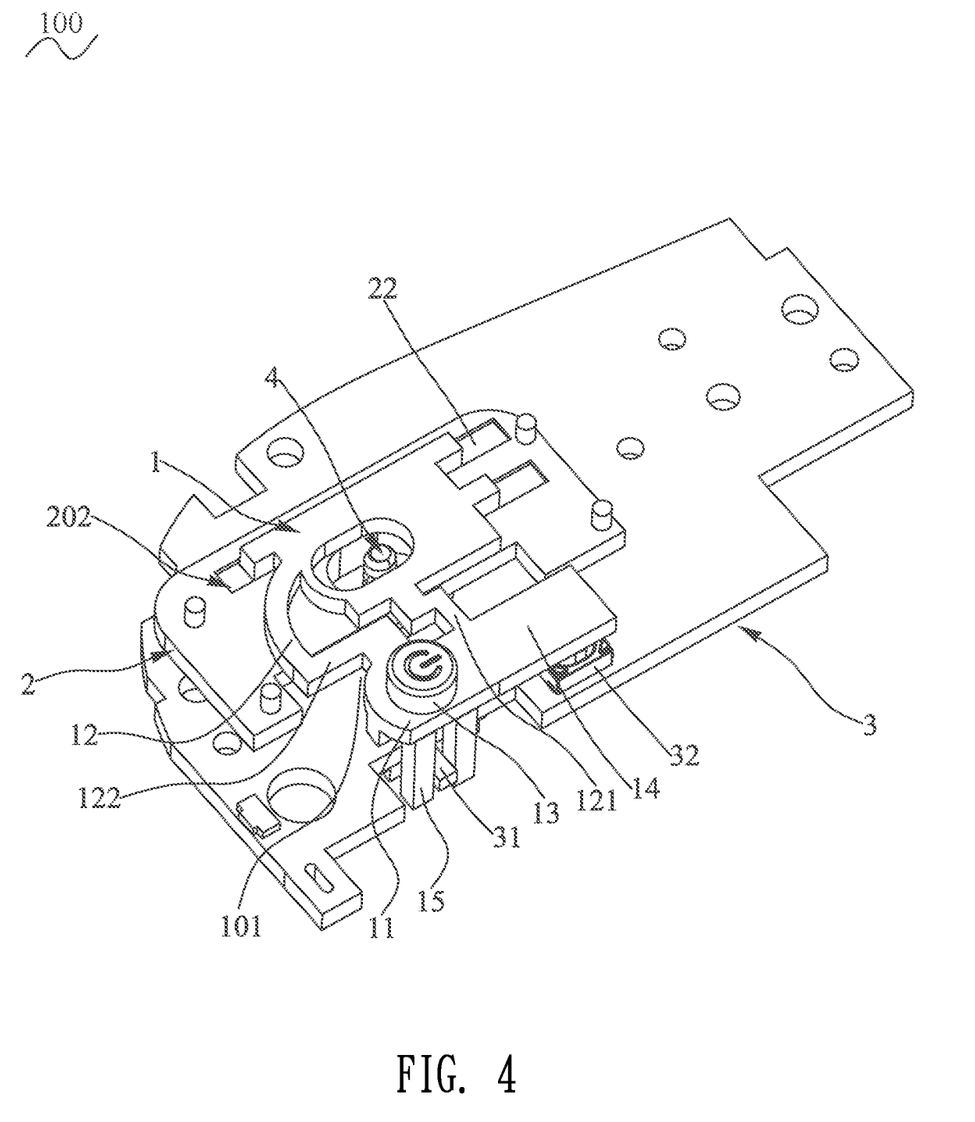
FIG. 4 is a perspective view of the switch module of the wireless mouse of FIG. 1.
Figure 5:
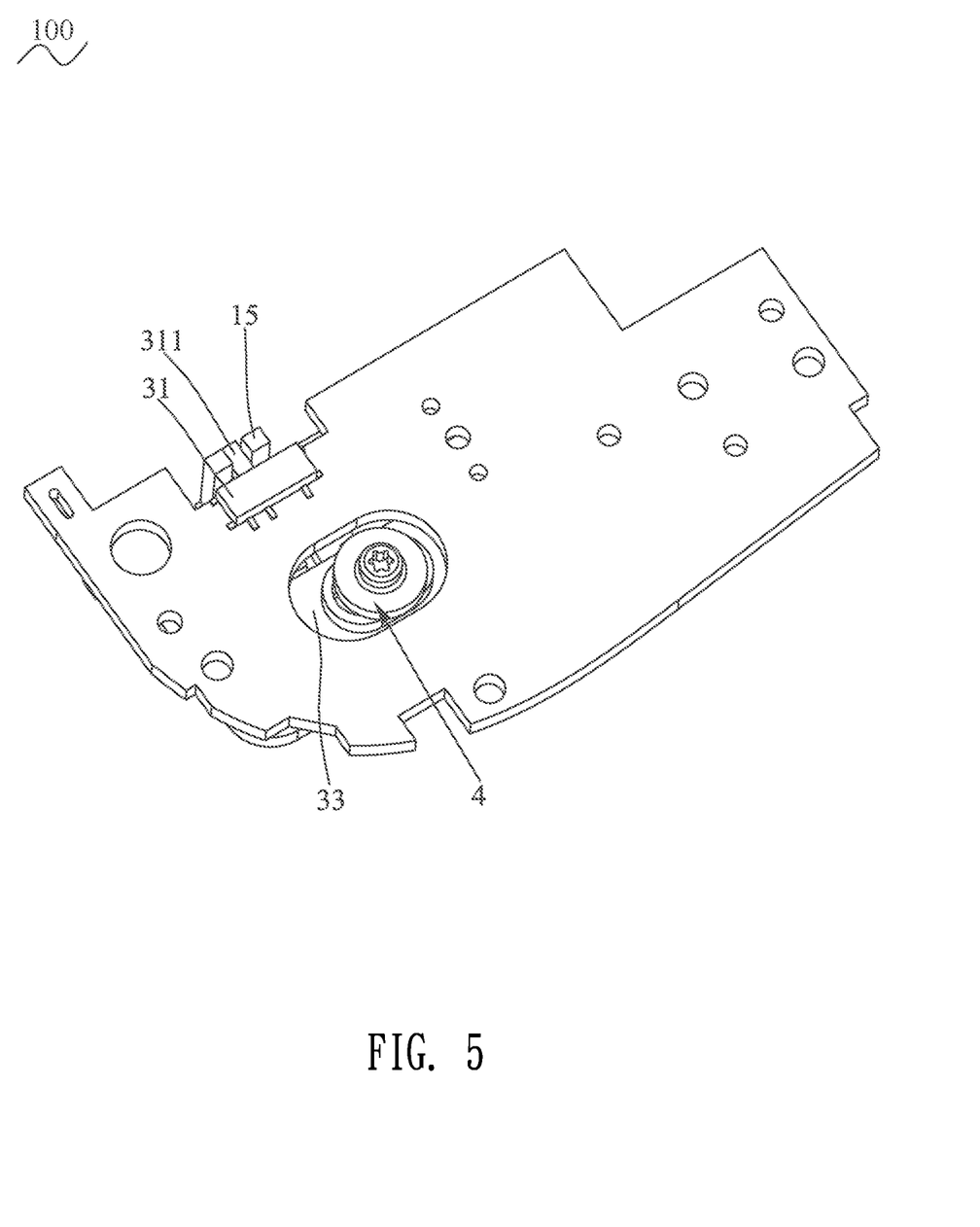
FIG. 5 is another perspective view of the switch module of the wireless mouse of FIG. 1.
Figure 6:
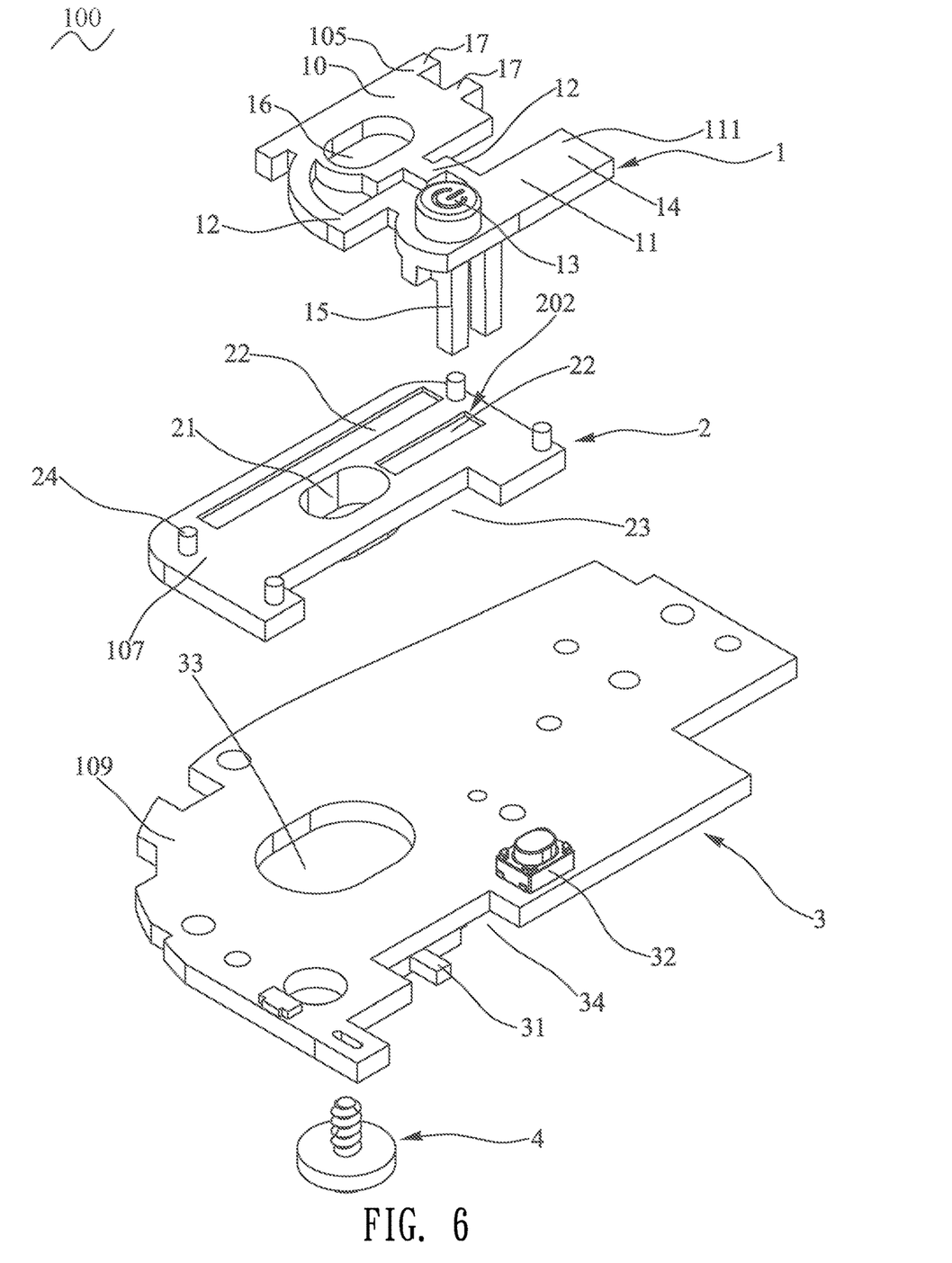
FIG. 6 is an exploded perspective view of the switch module of the wireless mouse of FIG. 1.
Figure 7:
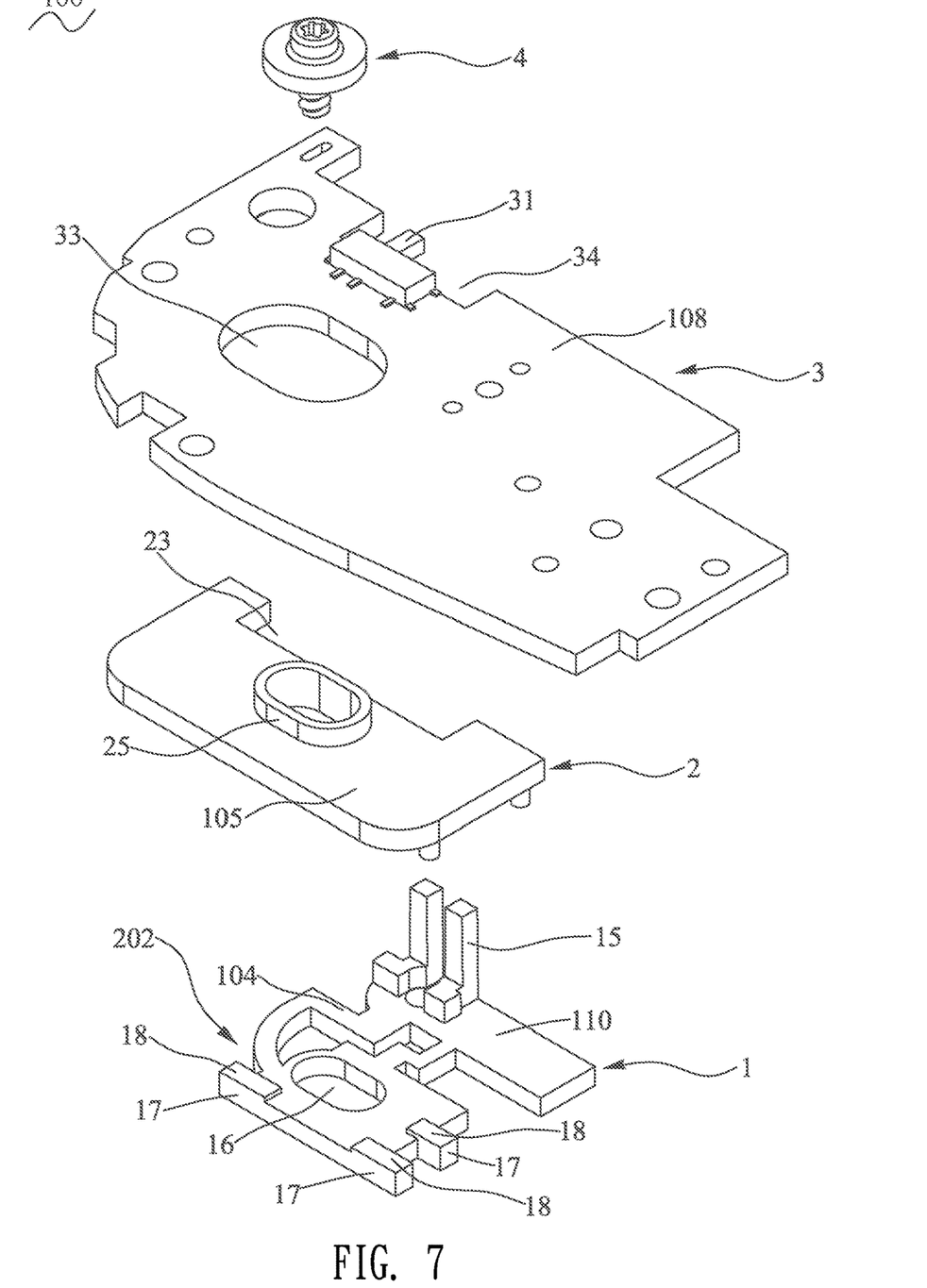
FIG. 7 is another exploded perspective view of the switch module of the wireless mouse of FIG. 1.
Figure 8:
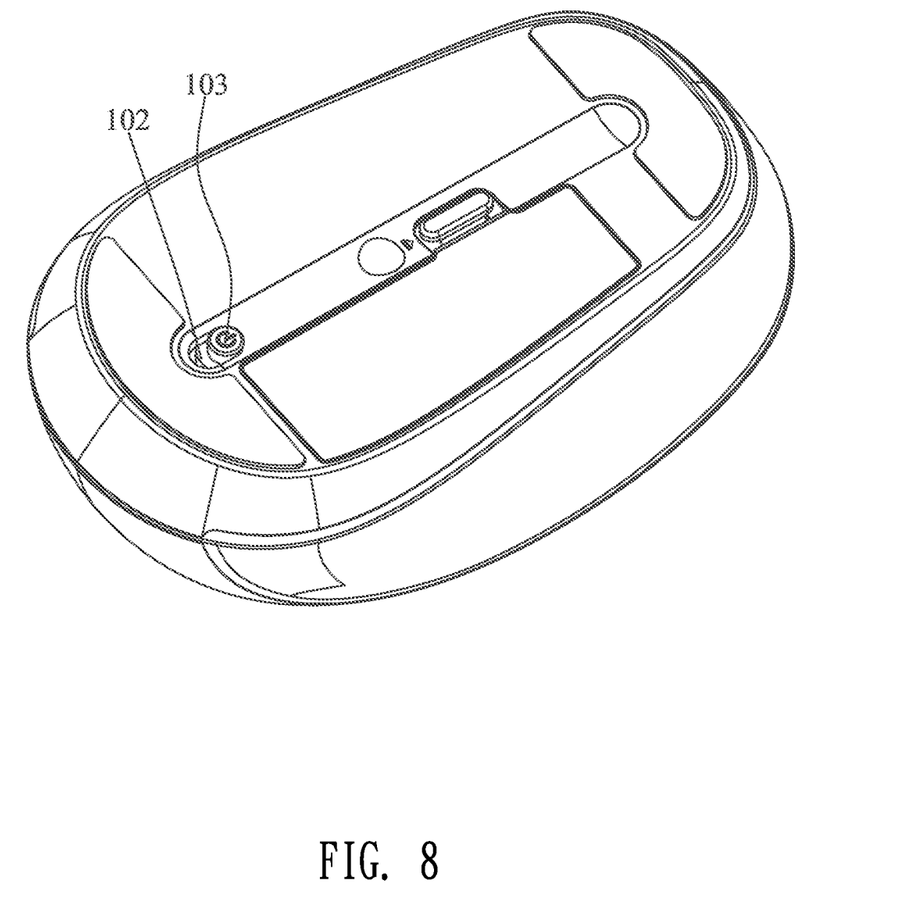
Figure 9:
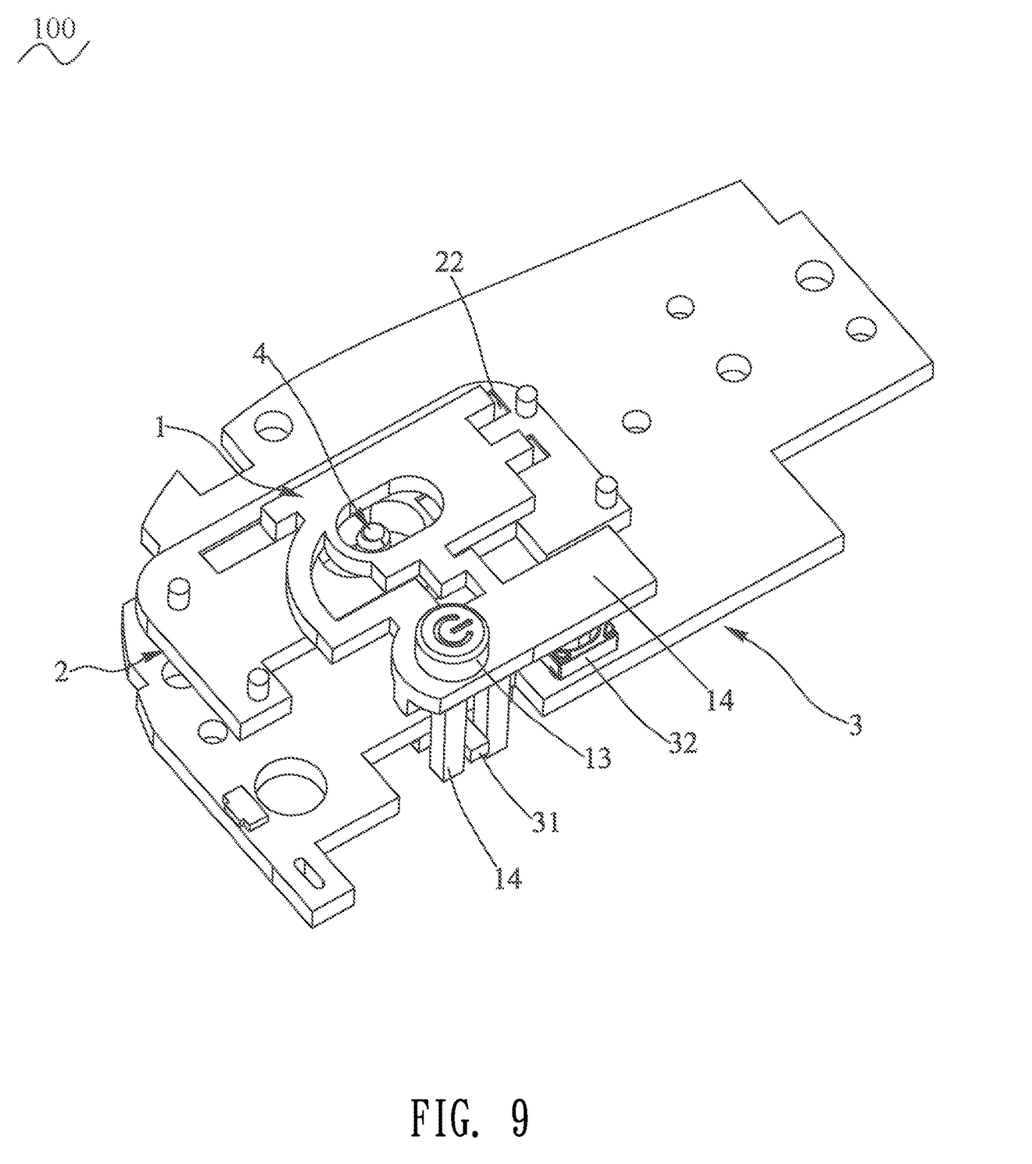

With reference to FIG. 1 to FIG. 3, a switch module 100 and a wireless mouse 200 in accordance with a preferred embodiment of the present invention are shown. The switch module 100 is applied in the wireless mouse 200. The wireless mouse 200 includes a lower shell 201, the switch module 100 and an upper shell 202. The switch module 100 is mounted to the lower shell 201 of the wireless mouse 200. The switch module 100 is mounted between the lower shell 201 and the upper shell 202. The upper shell 202 is covered to the lower shell 201 to form an accommodating space 203 between the upper shell 202 and the lower shell 201. The switch module 100 is accommodated in the accommodating space 203. In a specific implementation, the switch module 100 is also capable of being assembled to other types of equipments.

With reference to FIG. 1 to FIG. 9, the switch module 100 includes a pressing button 1, a supporting block 2, a circuit board 3, and a screw 4. The pressing button 1 is disposed to a bottom surface of the supporting block 2. The circuit board 3 is disposed above a top surface of the supporting block 2. The screw 4 passes through corresponding mechanisms of the circuit board 3, the supporting block 2 and the pressing button 1 for fastening the pressing button 1 to the lower shell 201 of the wireless mouse 200 to prevent the pressing button 1 from being disengaged with the supporting block 2, the circuit board 3 and the lower shell 201 of the wireless mouse 200.

The pressing button 1 includes a fastening element 10, a cantilever arm 11 and a connecting element 12. The fastening element 10 is a rectangular board shape. The cantilever arm 11 is a substantially rectangular board shape. The fastening element 10 is fastened to the bottom surface of the supporting block 2 to make the pressing button 1 be without deviating and sinking. One side of the fastening element 10 extends outward to form the connecting element 12. The connecting element 12 is disposed to an outside of the supporting block 2 and the connecting element 12 is suspended in midair. The connecting element 12 is located under and spaced from a bottom surface of the circuit board 3 to form a receiving space 101, so a part of the pressing button 1 is exposed out of the supporting block 2 and is located to one side of the supporting block 2, and the part of the pressing button 1 is spaced from the bottom surface of the circuit board 3 to form the receiving space 101 between the part of the pressing button 1 and the bottom surface of the circuit board 3.

The connecting element 12 includes a first connecting element 121 extended sideward, then extended frontward and further extended sideward from a middle of the one side of the fastening element 10, and a second connecting element 122 curved rearward, then extended frontward and further extended sideward from a rear of the one side of the fastening element 10. The first connecting element 121 is shown as a zigzag shape. The second connecting element 122 is shown as a tortuous shape. The second connecting element 122 is spaced from the first connecting element 121.

A free side of the connecting element 12 extends outward and opposite to the fastening element 10 to form the cantilever arm 11 extending lengthwise. The connecting element 12 is connected between the cantilever arm 11 and the fastening element 10. The cantilever arm 11 is spaced from the bottom surface of the circuit board 3 to form the receiving space 101 to make the cantilever arm 11 capable of being pressed towards the bottom surface of the circuit board 3 or being rebounded to an original position after pressing the cantilever arm 11 towards the bottom surface of the circuit board 3. The cantilever arm 11 is pressed towards the bottom surface of the circuit board 3 to be received in the receiving space 101 or rebounded out of the receiving space 101 to the original position with respect to the circuit board 3.

The cantilever arm 11 of the pressing button 1 has an operation portion 13, and at least one extending foot 15. The cantilever arm 11 is connected with an extending arm 14 disposed to one end of the operation portion 13. The one end of the operation portion 13 is equipped with the extending arm 14. A middle of a bottom surface of one end of the cantilever arm 11 protrudes downward to form an operation portion 13, and the other end of the cantilever arm 11 extends frontward and opposite to the one end of the cantilever arm 11 to form the extending arm 14. A bottom surface of the extending arm 14 is flush with the bottom surface of the one end of the cantilever arm 11. The operation portion 13 is disposed on the bottom surface of the one end of the cantilever arm 11 and is located behind the extending arm 14. The extending arm 14 is used for pressing towards the bottom surface of the circuit board 3 and touching a corresponding mechanism of the circuit board 3 to execute a bluetooth pairing function.

At least one portion of one side of a top surface of the cantilever arm 11 extends upward to form the at least one extending foot 15. The at least one extending foot 15 is located on the top surface of the cantilever arm 11, and the at least one extending foot 15 is located above the operation portion 13. The at least one extending foot 15 is substantially in alignment with the operation portion 13. In the preferred embodiment, the pressing button 1 has two spaced extending feet 15. When the operation portion 13 is pushed, the two extending feet 15 drive the corresponding mechanism of the circuit board 3 to realize a power function. The fastening element 10 has a through-hole 16 vertically penetrating through a top surface and a bottom surface of the fastening element 10. Several portions of a peripheral surface of the fastening element 10 protrude outward to form a plurality of limiting portions 17 projecting beyond the peripheral surface of the fastening element 10. Several portions of a front surface and a rear surface of the fastening element 10 protrude outward to form the plurality of the limiting portions 17 projecting beyond the front surface and the rear surface of the fastening element 10.

Two limiting portions 17 are protruded outward from two opposite sides of the front surface of the fastening element 10. One limiting portion 17 protruded outward from one side of the front surface of the fastening element 10 is in alignment with one limiting portion 17 protruded outward from one side of the rear surface of the fastening element 10. The screw 4 passes through the through-hole 16 to fasten the pressing button 1 to the lower shell 201 of the wireless mouse 200 for preventing the pressing button 1 from being disengaged with the supporting block 2 and the lower shell 201 of the wireless mouse 200. The plurality of the limiting portions 17 are disposed to a corresponding structure of the supporting block 2 to realize fastening the pressing button 1 to the bottom surface of the supporting block 2. A top surface of each limiting portion 17 protrudes upward to form a limiting block 18 projecting beyond the top surface of the fastening element 10. The pressing button 1 slides in the corresponding structure of the supporting block 2 frontward and rearward by virtue of the limiting blocks 18 of the plurality of the limiting portions 17 sliding in the corresponding structure of the supporting block 2. In the preferred embodiment, the pressing button 1 is an elastic body, so the pressing button 1 has a function of being pressed towards the circuit board 3 and a resilience function. The at least one extending foot 15 moves upward or returns to an original position with respect to the circuit board 3 and in the accommodating space 203.

The supporting block 2 supports the pressing button 1. The supporting block 2 defines a first locating hole 21 vertically penetrating through middles of the top surface of the supporting block 2. The screw 4 passes through the first locating hole 21 and the through-hole 16 to fasten the supporting block 2 to the pressing button 1 and further fasten the pressing button 1 and the supporting block 2 to the lower shell 201 of the wireless mouse 200 for preventing the supporting block 2 from being disengaged with the pressing button 1 and the lower shell 201 of the wireless mouse 200. A top of the screw 4 is blocked by a top surface of a peripheral wall of the first locating hole 21. At least two portions of the bottom surface of the supporting block 2 are recessed upward to form at least one sliding rail 22. The plurality of the limiting portions 17 protrude towards an inside of the at least one sliding rail 22 to form a plurality of the limiting blocks 18. The plurality of the limiting blocks 18 are slidably disposed in the at least one sliding rail 22.

In the preferred embodiment, two portions of the bottom surface of the supporting block 2 are recessed upward to form two sliding rails 22. The two sliding rails 22 are arranged transversely and spaced from each other. A middle of the one side of the supporting block 2 is recessed inward to form a notch 23. Several portions of the bottom surface of the supporting block 2 protrude downward to form a plurality of location pillars 24. In the preferred embodiment, four corners of the bottom surface of the supporting block 2 protrude downward to form four location pillars 24. A middle of the top surface of the supporting block 2 protrudes upward to form a ring-shaped abutting portion 25. The abutting portion 25 is elliptical. The supporting block 2 is disposed to a top surface of the pressing button 1. The through-hole 16 and the first locating hole 21 are perforations.

The at least one sliding rail 22 surround a periphery of the first locating hole 21. In the preferred embodiment, the supporting block 2 has two sliding rails 22. One sliding rail 22 is disposed to an outside of the other sliding rail 22. The one sliding rail 22 is longer than the other sliding rail 22. The plurality of the limiting portions 17 are disposed in the at least two sliding rails 22 to realize fastening the pressing button 1 to the supporting block 2. The one limiting portion 17 protruded outward from the one side of the front surface of the fastening element 10 and the one limiting portion 17 protruded outward from the one side of the rear surface of the fastening element 10 are slidably disposed in the one sliding rail 22. The other limiting portion 17 protruded outward from the other side of the front surface of the fastening element 10 is slidably disposed in the other sliding rail 22.

The limiting blocks 18 of the plurality of the limiting portions 17 are disposed in the two sliding rails 22 to realize that the pressing button 1 slide along the supporting block 2. The connecting element 12 is disposed above the notch 23, and the connecting element 12 is suspended in midair and is located to the one side of the supporting block 2. The bottom surface of the supporting block 2 has the plurality of the location pillars 24. The plurality of the location pillars 24 is used for being fastened to the lower shell 201 of the wireless mouse 200 to realize a location and a fixation between the supporting block 2 and the wireless mouse 200. The ring-shaped abutting portion 25 surrounds the first locating hole 21. The abutting portion 25 is used for fastening a position of the screw 4 to make the screw 4 be without deviating from the position where the screw 4 is fastened.

The circuit board 3 is equipped with a first switch 31 and a second switch 32. The circuit board 3 has a second locating hole 33 and an accommodating recess 34. One side of the circuit board 3 is recessed inward to form the accommodating recess 34. The first switch 31 is mounted on one side of a top surface of the circuit board 3. The second switch 32 is mounted to the bottom surface of the circuit board 3, and is located to and spaced from one side of the accommodating recess 34. The extending arm 14 is located under the second switch 32. An outer side of the first switch 31 has a shifting bar 311 projecting into the accommodating recess 34. The cantilever arm 11 is disposed under the accommodating recess 34. The accommodating recess 34 makes the cantilever arm 11 have a space for sliding frontward and rearward, and being pressed upward and towards the shifting bar 311 of the first switch 31.

In the preferred embodiment, the first switch 31 is a power switch. The second switch 32 is a pairing switch. The second locating hole 33, the first locating hole 21 and the through-hole 16 are overlapped from top to bottom. The screw 4 passes through the second locating hole 33, the first locating hole 21 and the through-hole 16 to fasten the switch module 100 to the lower shell 201 of the wireless mouse 200 for preventing the switch module 100 from being disengaged with the lower shell 201 of the wireless mouse 200. In practice, the switch module 100 is capable of being fastened by use of other ways. The top surface of the circuit board 3 is equipped with the first switch 31. and the first switch 31 is partially disposed between the two extending feet 15. The shifting bar 311 of the first switch 31 is disposed corresponding to the at least one extending foot 15. The at least one extending foot 15 is disposed to one side of the first switch 31. The shifting bar 311 of the first switch 31 is disposed between the two extending feet 15. When the operation portion 13 is pushed to slide frontward and rearward, the two extending feet 15 drive the first switch 31 to move to realize a power function. The bottom surface of the circuit board 3 is equipped with the second switch 32. When the extending arm 14 is pressed towards the second switch 32 of the circuit board 3, the second switch 32 is used for being contacted with the extending arm 14 to execute a bluetooth pairing function.

In the preferred embodiment, the pressing button 1 has a first surface 104, and a second surface 105 opposite to the first surface 104. At least one portion of one side of the first surface 104 of the pressing button 1 protrudes upward to form the at least one extending foot 15. At least one portion of the other side of the first surface 104 of the pressing button 1 protrudes upward to form at least one limiting block 18. The second surface 105 of the pressing button 1 has the operation portion 13 protruded outward. The supporting block 2 has a third surface 106, and a fourth surface 107 opposite to the third surface 106. The fourth surface 107 faces to the first surface 104. The fourth surface 107 of the supporting block 2 defines the at least one sliding rail 22 recessed inward. The at least one sliding rail 22 and the at least one limiting block 18 form a sliding assembly 202. The pressing button 1 is located to the supporting block 2. The at least one limiting block 18 is disposed in the at least one sliding rail 22.

The circuit board 3 faces to the third surface 106 of the supporting block 2. The circuit board 3 has a fifth surface 108, and a sixth surface 109 opposite to the fifth surface 108. The fifth surface 108 of the circuit board 3 is equipped with the first switch 31. The sixth surface 109 of the circuit board 3 is equipped with the second switch 32. The connecting element 12 is located under and spaced from the sixth surface 109 of the circuit board 3. The cantilever arm 11 is spaced from the sixth surface 109 of the circuit board 3 to form the receiving space 101 to make the cantilever arm 11 and the extending arm 14 pressed towards the sixth surface 109 of the circuit board 3 or rebounded to the original position after pressing the cantilever arm 11 together with the extending arm 14 towards the sixth surface 109 of the circuit board 3. The cantilever arm 11 has a seventh surface 110, and an eighth surface 111 opposite to the seventh surface 110. One end of the eighth surface 111 of the cantilever arm 11 protrudes opposite to the at least one extending foot 15 to form the operation portion 13, and the other end of the eighth surface 111 of the cantilever arm 11 extends opposite to the one end of the eighth surface 111 of the cantilever arm 11 and extends to the seventh surface 110 of the cantilever arm 11 to form the extending arm 14. The extending arm 14 is smoothly connected with the cantilever arm 11. A peripheral surface of the extending arm 14 is connected with and flush with a peripheral surface of the cantilever arm 11. The extending arm 14 is aligned with the cantilever arm 11. One end of the seventh surface 110 of the cantilever arm 11 protrudes opposite to the eighth surface 111 to form the at least one extending foot 15. The sliding assembly 202 is slidably disposed between the first surface 104 of the pressing button 1 and the fourth surface 107 of the supporting block 2.

Referring to FIG. 1 to FIG. 9, the operation portion 13 of the pressing button 1 transversely moves from a first position 102 to a second position 103. When the operation portion 13 of the pressing button 1 is located at the first position 102, the at least one extending foot 15 is without driving the shifting bar 311 of the first switch 31 to move to realize a power function, and the first switch 31 is located at an initial position, at the moment, the power function is turned off.

Referring to FIG. 1 to FIG. 9 again, when the operation portion 13 of the pressing button 1 is located at the second position 103, the at least one extending foot 15 drives the shifting bar 311 of the first switch 31 to move frontward to realize the power function, and the extending arm 14 is corresponding to the second switch 32, at the moment, the power function is turned on, the operation portion 13 is capable of being pressed towards the circuit board 3 to make the extending arm 14 press the second switch 32 of the second the circuit board 3 to execute the bluetooth pairing function.

In the preferred embodiment, the first surface 104 and the second surface 105 of the pressing button 1 are defined as the top surface and a bottom surface of the pressing button 1. The third surface 106 and the fourth surface 107 of the supporting block 2 are defined as the top surface and the bottom surface of the supporting block 2. The fifth surface 108 and the sixth surface 109 of the circuit board 3 are defined as the top surface and the bottom surface of the circuit board 3. The seventh surface 110 and the eighth surface 111 of the cantilever arm 11 are defined as the top surface and the bottom surface of the cantilever arm 11.

The circuit board 3 faces to the third surface 106 of the supporting block 2. The circuit board 3 is equipped with the first switch 31 and the second switch 32. So in another condition, when the operation portion 13 is located at the first position 102, the at least one extending foot 15 is disposed to the one side of the first switch 31, when the pressing button 1 slides by the sliding assembly 202 to make the operation portion 13 move to the second position 103, the at least one extending foot 15 pushes against the first switch 31, the second switch 32 is disposed between the circuit board 3 and the extending arm 14 of the pressing button 1. The sliding assembly 202 includes at least one sliding rail 22 formed in the fourth surface 107 of the supporting block 2, and at least one limiting block 18 protruded from the first surface 104 of the pressing button 1, the at least one limiting block 18 is slidably limited in the at least one sliding rail 22.

As described above, when the operation portion 13 of the pressing button 1 is pushed frontward and rearward, the at least one extending foot 15 drives the first switch 31 of the circuit board 3 to realize the power function, when the operation portion 13 of the pressing button 1 is located at the first position 102, the at least one extending foot 15 is without driving the first switch 31, at the moment, the power function is turned off, when the operation portion 13 of the pressing button 1 is located at the second position 103, the at least one extending foot 15 drives the first switch 31, at the moment, the power function is turned on, the operation portion 13 is capable of being pressed towards the circuit board 3 to make the extending arm 14 press the second switch 32 of the second the circuit board 3 to execute the bluetooth pairing function. As a result, the switch module 100 is capable of reducing a manufacturing cost to have a lower cost and reducing an assembling space of the switch module 100 to save an occupying space.

What is claimed is:

1. A switch module applied in a wireless mouse, comprising:
a pressing button having a first surface, and a second surface opposite to the first surface, the second surface of the pressing button having an operation portion protruded outward, the operation portion moving from a first position to a second position, one end of the operation portion being equipped with an extending arm, at least one portion of one side of the first surface of the pressing button protruding upward to form at least one extending foot, at least one portion of the other side of the first surface of the pressing button protruding upward to form at least one limiting block;
a supporting block supporting the pressing button, the supporting block having a third surface, and a fourth surface opposite to the third surface, the fourth surface facing to the first surface, the fourth surface of the supporting block defining at least one sliding rail recessed inward, the pressing button being located to the supporting block, the at least one limiting block being disposed in the at least one sliding rail; and
a circuit board facing to the third surface of the supporting block, the circuit board having a fifth surface, and a sixth surface opposite to the fifth surface, the fifth surface of the circuit board being equipped with a first switch, the sixth surface of the circuit board being equipped with a second switch, the first switch being disposed corresponding to the at least one extending foot, when the operation portion is located at the first position, the at least one extending foot being without driving the first switch, and the first switch being located at an initial position, when the operation portion is located at the second position, the at least one extending foot driving the first switch, and the extending arm being corresponding to the second switch.

2. The switch module as claimed in claim 1, wherein the pressing button includes a fastening element, a cantilever arm and a connecting element, one side of the fastening element extends outward to form the connecting element, the connecting element is disposed to an outside of the supporting block and is suspended in midair, the connecting element is located under and spaced from the sixth surface of the circuit board.

3. The switch module as claimed in claim 2, wherein a free side of the connecting element extends outward and opposite to the fastening element to form the cantilever arm extending lengthwise, the cantilever arm is spaced from the sixth surface of the circuit board to form the receiving space to make the cantilever arm pressed towards the sixth surface of the circuit board or rebounded to an original position after pressing the cantilever arm towards the sixth surface of the circuit board.

4. The switch module as claimed in claim 2, wherein several portions of a peripheral surface of the fastening element protrude outward to form a plurality of limiting portions projecting beyond the peripheral surface of the fastening element, the plurality of the limiting portions are disposed in the at least one sliding rail.

5. The switch module as claimed in claim 4, wherein the plurality of the limiting portions protrude towards an inside of the at least one sliding rail to form a plurality of the limiting blocks, the plurality of the limiting blocks are slidably disposed in the at least one sliding rail.

6. The switch module as claimed in claim 2, wherein the cantilever arm has the operation portion and the at least one extending foot, the cantilever arm is connected with the extending arm disposed to the one end of the operation portion, the cantilever arm has a seventh surface, and an eighth surface opposite to the seventh surface, one end of the eighth surface of the cantilever arm protrudes opposite to the at least one extending foot to form the operation portion, and the other end of the eighth surface of the cantilever arm extends opposite to the one end of the eighth surface of the cantilever arm and extends to the seventh surface of the cantilever arm to form the extending arm, the extending arm is aligned with the cantilever arm.

7. The switch module as claimed in claim 6, wherein one end of the seventh surface of the cantilever arm protrudes opposite to the eighth surface to form the at least one extending foot, the at least one extending foot is substantially in alignment with the operation portion.

8. The switch module as claimed in claim 6, wherein a peripheral surface of the extending arm is connected with and flush with a peripheral surface of the cantilever arm.

9. The switch module as claimed in claim 6, wherein the seventh surface and the eighth surface of the cantilever arm are defined as a top surface and a bottom surface of the cantilever arm.

10. The switch module as claimed in claim 2, wherein one side of the supporting block is recessed inward to form a notch, the connecting element is disposed above the notch, and the connecting element is suspended in midair and is located to the one side of the supporting block.

11. The switch module as claimed in claim 2, wherein one side of the circuit board is recessed inward to form an accommodating recess, the cantilever arm is disposed under the accommodating recess.

12. The switch module as claimed in claim 1, wherein the pressing button is an elastic body.

13. The switch module as claimed in claim 1, wherein when the extending arm is pressed towards the second switch of the circuit board, the second switch is used for being contacted with the extending arm.

14. The switch module as claimed in claim 1, wherein the switch module is applied in the wireless mouse, the wireless mouse includes a lower shell and an upper shell, the upper shell is covered to the lower shell to form an accommodating space between the upper shell and the lower shell, the at least one extending foot moves upward or returns to an original position with respect to the circuit board and in the accommodating space.

15. The switch module as claimed in claim 1, wherein the first surface and the second surface of the pressing button are defined as a top surface and a bottom surface of the pressing button, the third surface and the fourth surface of the supporting block are defined as a top surface and a bottom surface of the supporting block, the fifth surface and the sixth surface of the circuit board are defined as a top surface and a bottom surface of the circuit board.

16. The switch module as claimed in claim 1, wherein the pressing button has two spaced extending feet, one side of the circuit board is recessed inward to form an accommodating recess, an outer side of the first switch has a shifting bar projecting into the accommodating recess, the shifting bar is disposed between the two extending feet.

17. A switch module, comprising:
a pressing button having a first surface, and a second surface opposite to the first surface, the second surface of the pressing button having an operation portion, the cantilever arm being connected with an extending arm disposed to one end of the operation portion, the operation portion moving from a first position to a second position, at least one portion of one side of the first surface of the pressing button protruding upward to form at least one extending foot;
a supporting block having a third surface, and a fourth surface opposite to the third surface, the fourth surface facing to the first surface, a sliding assembly being slidably disposed between the first surface of the pressing button and the fourth surface of the supporting block; and
a circuit board facing to the third surface of the supporting block, the circuit board being equipped with a first switch and a second switch, when the operation portion is located at the first position, the at least one extending foot being disposed to one side of the first switch, when the pressing button slides by the sliding assembly to make the operation portion move to the second position, the at least one extending foot pushing against the first switch, the second switch being disposed between the circuit board and the extending arm of the pressing button.

18. The switch module as claimed in claim 17, wherein the sliding assembly includes at least one sliding rail formed in the fourth surface of the supporting block, and at least one limiting block protruded from the first surface of the pressing button, the at least one limiting block is slidably limited in the at least one sliding rail.

19. A wireless mouse, comprising:
a lower shell;
an upper shell covered to the lower shell to form an accommodating space between the upper shell and the lower shell; and
a switch module accommodated in the accommodating space, the switch module including
a pressing button having a first surface, and a second surface opposite to the first surface, the second surface of the pressing button having an operation portion protruded outward, the operation portion moving from a first position to a second position, one end of the operation portion being equipped with an extending arm, at least one portion of one side of the first surface of the pressing button protruding upward to form at least one extending foot, at least one portion of the other side of the first surface of the pressing button protruding upward to form at least one limiting block,
a supporting block supporting the pressing button, the supporting block having a third surface, and a fourth surface opposite to the third surface, the fourth surface facing to the first surface, the fourth surface of the supporting block defining at least one sliding rail recessed inward, the pressing button being located to the supporting block, the at least one limiting block being disposed in the at least one sliding rail, and
a circuit board facing to the third surface of the supporting block, the circuit board having a fifth surface, and a sixth surface opposite to the fifth surface, the fifth surface of the circuit board being equipped with a first switch, the sixth surface of the circuit board being equipped with a second switch, the first switch being disposed corresponding to the at least one extending foot, when the operation portion is located at the first position, the at least one extending foot being without driving the first switch, and the first switch being located at an initial position, when the operation portion is located at the second position, the at least one extending foot driving the first switch, and the extending arm being corresponding to the second switch.

\* \* \* \* \*